United States Patent
Pollock (10) Patent No.: US 11,822,919 B2
(45) Date of Patent: *Nov. 21, 2023

(54) AUTO-GENERATION OF API DOCUMENTATION VIA IMPLEMENTATION-NEUTRAL ANALYSIS OF API TRAFFIC

(71) Applicant: CLOUD SOFTWARE GROUP, INC., Ft. Lauderdale, FL (US)

(72) Inventor: Jeremy Pollock, San Francisco, CA (US)

( * ) Notice: Subject to any disclaimer, the term of this patent is extended or adjusted under 35 U.S.C. 154(b) by 52 days.

This patent is subject to a terminal disclaimer.

(21) Appl. No.: 17/358,958

(22) Filed: Jun. 25, 2021

(65) Prior Publication Data

US 2021/0318866 A1 Oct. 14, 2021

Related U.S. Application Data

(63) Continuation of application No. 15/662,140, filed on Jul. 27, 2017, now Pat. No. 11,074,067.

(51) Int. Cl.
  *G06F 8/73* (2018.01)
(52) U.S. Cl.
  CPC ................... *G06F 8/73* (2013.01)
(58) Field of Classification Search
  None
  See application file for complete search history.

(56) References Cited

U.S. PATENT DOCUMENTS

| | | | | |
|---|---|---|---|---|
| 9,015,730 | B1* | 4/2015 | Allen | G06F 9/54 |
| | | | | 719/310 |
| 2009/0210861 | A1* | 8/2009 | Alupului | G06F 8/73 |
| | | | | 717/123 |
| 2011/0202933 | A1* | 8/2011 | Sherrill | G06F 8/73 |
| | | | | 717/123 |
| 2014/0289702 | A1* | 9/2014 | McMahon | G06F 8/30 |
| | | | | 715/239 |
| 2016/0026461 | A1* | 1/2016 | Bannister | G06F 8/73 |
| | | | | 717/123 |
| 2017/0012838 | A1* | 1/2017 | Kashtan | H04L 43/06 |

OTHER PUBLICATIONS

Buse et al., "Automatic Documentation Inference for Exceptions", ACM, 9pg. (Year: 2008).*
McBurney et al., "Automatic Documentation Generation via Source Code Summarization of Method Context", ACM, 12pg. (Year: 2012).*
Pradel et al., "Automatic Generation of Object Usage Specifications from Large Method Traces", IEEE, 12pg. (Year: 2009).*
API Fortress, "Testing for the Full API Lifecycle," downloaded Jul. 21, 2017, http://apifortress.com/.
Goofmint, "cURL to Swagger," Jul. 20, 2016, https://github.com/goofmint/cURLtoSwagger.

(Continued)

*Primary Examiner* — Ryan D. Coyer (57) ABSTRACT

A method of API documentation generation includes receiving an API interaction, determining at least one interaction parameter based on the API interaction, and automatically generating the documentation based on the at least one interaction parameter. The generated documentation documents an action associated with the API interaction.

20 Claims, 7 Drawing Sheets

(56) References Cited

OTHER PUBLICATIONS

Y Combinator, "Secful (YC W16) Prevents API Attacks Automatically and in Real-Time," Mar. 21, 2016.
Sohan et al., "Automated example oriented REST API documentation at Cisco," IEEE, May 28, 2017, 10pg. (Year: 2017).
Merono et al., "grlc Makes GitHub Taste Like Linked Data AP Is", Springer, 2016, 8pg. (Year: 2012).
Parnin et al., "Crowd Documentation: Exploring the Coverage and the Dynamics of API Discussions on Stack Overflow", Georgia Tech, 2012, 11pg. (Year: 2012).
Jdin et al., "How API Documentation Fails", IEEE, 2015, 9pg. (Year: 2015).
Sohan et al., "SpyREST: Automated RESTful API Documentation using an HTTP Proxy Server," 2015, IEEE, 6pg. (Year: 2015).
Danielsen et al., "Validation and Interactivity of Web API Documentation," 2013, IEEE, 8pg. (Year: 2013).

* cited by examiner

```
curl ` https://api.example.com/v1/
products ' -X POST
-d '{"name": "Blue Shoe", "price":
33.33}'
```
FIRST REQUEST

```
curl ` https://api.example.com/v1/
products ' -X POST
-d '{"name": "Red Shoe", "price":
43.33, "sale": true,
"discount":0.25}'
```
SECOND REQUEST

API DOCUMENTATION

```
swagger: "2.0"
info:
   description: "TBD"
   version: "1.0.0"
   title: "products API"
host: "api.example.com"
basePath: "/v1"
schemes:
- "http2"
paths:
   /products:
      post:
         operationId: "addProduct"
         consumes:
         - "application/json"
         produces:
         - "application/json"
         parameters:
         - in: "body"
           name: "name"
           description: "name of product"
           required: true
           type: "string"
         - in: "body"
           name: "price"
           description: "price of product"
           required: true
           type: "decimal"
         - in: "body"
           name: "sale"
           description: "sale of product"
           required: true
           type: "boolean"
         - in: "body"
           name: "discount"
           description: "discount of product"
           required: true
           type: "decimal"
```

AUTO-GENERATION OF API DOCUMENTATION VIA IMPLEMENTATION-NEUTRAL ANALYSIS OF API TRAFFIC

BACKGROUND OF THE INVENTION

Application programming interfaces (APIs) facilitate usage of underlying computing tools by defining input to the computing tool such that the tool may be used without revealing implementation details of the tool. Sometimes documentation, which is a description of how an API functions, is provided with the API to facilitate use of the API. Whether documentation is provided for an API or the quality of the documentation provided for an API can affect its usage and popularity with users. Conventional techniques of API documentation are costly, insufficiently descriptive, or incompatible with legacy APIs, thus discouraging use of associated APIs.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Documentation about an application programming interface (API) may be provided to facilitate usage of the API. If documentation is not provided or is unclear, there may be many repercussions. For example, breaking changes that are undocumented may cause frustration because the API does not perform as expected. If users do not understand how the API should be used, they may be reluctant to use the API. It may be difficult for humans to manage API documentation alone, e.g., if there are numerous APIs requiring documentation. For example, legacy APIs that have not been previously well-documented may be difficult for humans to later document.

Conventionally, some documentation and test consoles are provided with an API. However, this may be inadequate for a user of the API. If the documentation is inadequate, users of the API may find it difficult to use the API, e.g., to automate the user's own systems. Typically, API providers select between three techniques for generating API documentation: developer-generated documentation, writer-generated documentation, and code-generated documentation. Developer-generated documentation relies on API programmers who develop APIs to generate documentation for the APIs. The documentation generated by the programmers themselves can be too technical, not have enough detail, and be infrequently updated, e.g., if programmers prioritize coding over writing documentation. Writer-generated documentation refers to documentation that is written and maintained by technical writers. Typically, this type of documentation requires a clean handoff from the engineering team and is costly because a dedicated writing team generates the documentation. Code-generated documentation refers to documentation that is derived automatically from API code. For example, the API code may be annotated with developer-focused information for an internal audience. Although this type of documentation may be performed automatically, it is often very technical and not suitable for external consumption due to proprietary information or jargon. For example, different languages may have different annotation conventions that might be familiar to only those fluent in a particular language.

Regardless of how they are generated, conventional documentation may be inadequate. For example, static documentation may be less intelligible than interactive documentation. As another example, many documentation techniques do not accommodate legacy APIs. A Swagger specification (also known as OpenAPI specification) is a type of human-readable and machine-readable specification that provides both documentation and automation ability for APIs. Swagger is a specification for machine-readable interface files for describing, producing, consuming, and visualizing RESTful web services. However, Swagger specifications do not accommodate legacy APIs. In some user environments and systems, numerous (on the order of tens of thousands) of APIs are legacy APIs that have not been properly documented. For example, the documentation may be stale, inaccurate, and/or incomplete. The legacy APIs may still be usable and valuable, but users are reluctant to use them because documentation, if any, for the legacy APIs is inadequate.

As another example, some conventional techniques may generate documentation automatically if curl commands are provided. For example, according to typical conventional techniques, curl commands are manually formed and documentation may be generated therefrom. This means that the documentation process is not fully automated because a human needs to form a curl command in order to generate the documentation process. Multiple curl commands may need to be formulated for each API request, making this a tedious process.

There are numerous benefits to well-documented APIs. For example, a good documentation for API is intelligible, succinct, descriptive, and both human-readable (meaningful to developers and lay-people) and machine-readable. API documentation that is human-readable allows developers and other users to understand API request/response inputs and behaviors. API documentation that is machine-readable allows programs to generate applications and test suites. Machine-readable documentation also facilitates integration of APIs into various systems and infrastructure. Documentation of APIs affects user experience, and APIs that are well-documented are well-received and more likely to be adopted and used. Clear documentation may be associated with stability and confidence in the use of APIs.

Automatic generation of API documentation via implementation-neutral analysis of API traffic is disclosed. In one aspect, well-documented documentation may be conveniently and automatically generated in real-time or based on logged API traffic. In another aspect, the analysis of API traffic is implementation-neutral meaning that the analysis may be performed for various types of languages and implementations. In various embodiment, a method of API documentation generation includes receiving an API interaction, determining at least one interaction parameter based on the API interaction, and automatically generating the documentation based on the at least one interaction parameter. The generated documentation documents an action associated with the API interaction.

Figure 1A:
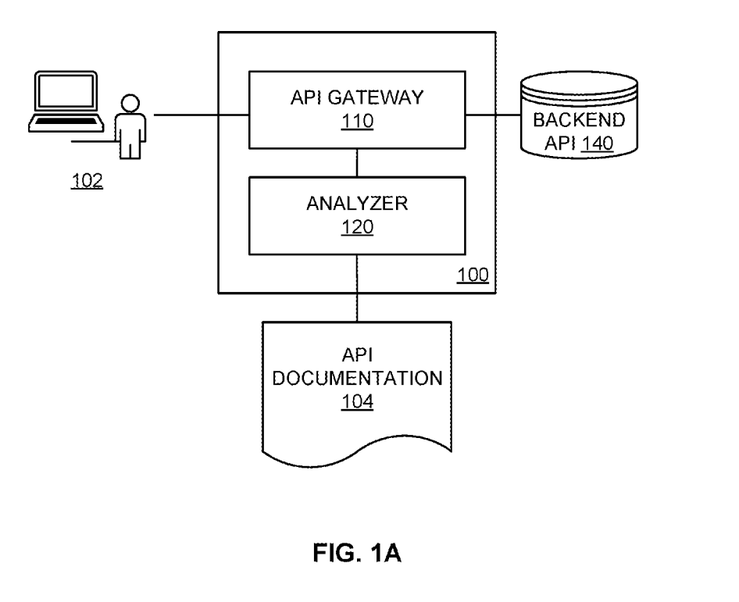
FIG. 1A is a block diagram illustrating an embodiment of a system for generating API documentation.

FIG. 1A is a block diagram illustrating an embodiment of a system for generating API documentation. The system 100 includes an API gateway 110 and an analyzer 120.

The API gateway 110 is configured to observe, receive, and/or handle API requests. In various embodiments, the API gateway receives an API request, forwards the API request to the backend API, and relays a response to the API request. The API gateway may intercept information provided to terminal 102 in association with the API request. The API gateway may determine operations to perform and resources to obtain based on the API request. The API gateway may parse an API request to determine requested operations and data to be obtained from backend API 140.

The analyzer 120 is configured to generate API documentation based on traffic data. The API documentation may be generated based on live traffic data or on previously stored traffic data. In some embodiments, the analyzer generates documentation based on traffic data observed as part of proxying logic. In one aspect, API documentation can be generated while the API is being developed or observed. In another aspect, API documentation can be generated for previously-developed APIs including legacy APIs. In some embodiments, the analyzer generates documentation based on data obtained from complementary data sources such as existing code and/or API definitions. The complementary data sources may enhance automatically-generated API documentation by using existing information about the API. For example, complementary data such as engineering documented code may be merged into the API auto-generation process to, among other things, validate auto-generated documentation against engineering specified documentation or enriching auto-generated documentation with more technical descriptions found in the code.

In various embodiments, the analyzer 120 collects data based on an API interaction such as an API request or response. For example, from an API request, the analyzer 120 is configured to collect hostname, HTTP method, security protocol used, if any (e.g., TLS), authentication type, request path, parameters such as URI and POST body, or the like. From an API response, the analyzer 120 may be configured to collect: response code, response message, response data, or the like. The analyzer 120 may collect data by determining the grammatical structure of an API interaction such as the structure of the request and any verbs or requested actions included in the API interaction.

In various embodiments, the analyzer 120 deduces API documentation data based on information from the API interaction. For example, from an API request, the analyzer 120 is configured to determine request parameter types, whether a request parameter is option or required, content type, security type, or the like. From an API response, the analyzer 120 may be configured to determine response data scheme or the like.

The analyzer 120 is configured to generate and/or update API documentation. In various embodiments, the API documentation 104 includes metadata about API interactions such as description of the functions of an API. In various embodiments, the API documentation documents an action associated with an API interaction. The API documentation may provide advice about errors such as runtime errors, changes to APIs, and the like. The API documentation may facilitate use of the API.

In various embodiments, the analyzer 120 is configured to generate and/or update API documentation according to the processes described herein. For example, an API interaction may be observed and automatically documented according to the process of FIG. 2. API documentation may be updated to cover previously undocumented API interactions according to the process of FIG. 3. API documentation may be automatically generated and updated based on feedback according to the process of FIG. 4. Automatically generated API documentation may be used to audit the quality of existing manual API documentation according to the process of FIG. 5. Changes to API documentation may be identified and alerts issued based on the changes according to the process of FIG. 6.

The backend API 140 is a backend interface that interfaces with the API gateway. For example, the backend API 140 may be in the control of another user such as a customer. The backend API is configured to service API requests received via API gateway 110 by forwarding the requests to backend computing modules. For example, the backend API may invoke portions of a backend system (not shown) to carry out operations to service the API request. In some embodiments, the backend API may parse the API request and determine relevant resources to obtain and return based on the API request. The backend API may be deployed in a cloud or on-site at a customer's location.

In operation, client 102 makes a call (e.g., interacts with an API such as making an API request). The API gateway 110 observes the call, forward the call for processing, and analyzer 120 automatically generates API documentation according to one or more of the processes described herein. For example, an API gateway receives an API request from the client, services the API request based on a backend API, and provides an API response. Responsive to receiving the API request, the API gateway forwards the API request to an analyzer 120. In some embodiments, the analyzer observes interactions between the API gateway and the backend API. The analyzer processes the API request, e.g., determining request data and/or response data, and automatically produces API documentation that is both machine-readable and human-readable.

Figure 1B:
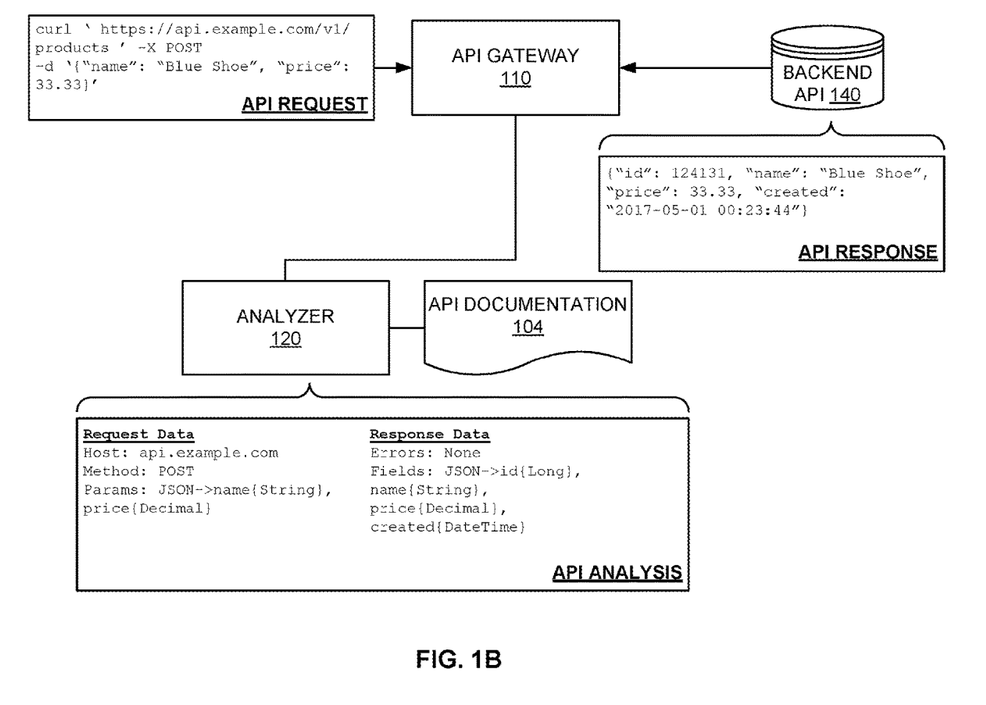
FIG. 1B is a block diagram illustrating an embodiment of a system for generating API documentation.

FIG. 1B is a block diagram illustrating an embodiment of a system for generating API documentation. The system includes an API gateway 110, an analyzer 120, and a backend API 140. The system includes the same modules as those in system 100 of FIG. 1A unless otherwise described herein.

In the example shown in FIG. 1B, API interactions observed by the API gateway 110 include an API request and response. An API request is "curl 'https://api.example.com/v1/products'-X POST -d '{"name": "Blue Shoe", "price": 33.33}'". This API request creates product information, and submits data to be processed by backend API 140. For example, when product information is created, a corresponding entry is stored in a database. The curl command combines HTML, scripting, and computing (e.g., Java, C++, etc.).

The API gateway 110 receives this API request, and may service this request and return an API response using the backend API 140. In this example, the API response is "{"id": 124131, "name": "Blue Shoe", "price": 3.33, "created": "2017 May 1 00:23:44"}".

The API gateway may forward the API interaction (here, a request and response) to analyzer 120. The analyzer may determine the interaction data (here, request data and response data) shown in Table 1 below.

TABLE 1

| Request Data | Response Data |
| --- | --- |
| Host: api.example.com | Errors: None |
| Method: POST | Fields: JSON->id{Long}, |
| Params: JSON->name{String}, | name{String}, |
| price{Decimal} | price{Decimal}, |
|  | created{DateTime} |

Based on the determined request data and response data, the analyzer 120 generates API documentation 104. In various embodiments, analyzer 120 is further configured to update API documentation and/or generate an alert if a change is detected.

Although the example shown in FIG. 1B shows a single API request, in other embodiments, the API gateway may handle a plurality of API requests. A plurality of API requests may be received sequentially or substantially simultaneously and may be from one or more sources.

Figure 2:
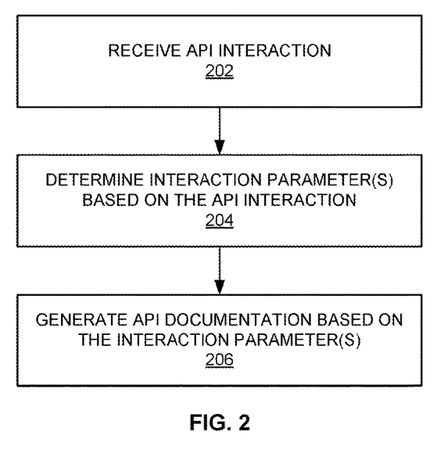
FIG. 2 is a flow chart illustrating an embodiment of a process for generating API documentation.

FIG. 2 is a flow chart illustrating an embodiment of a process for generating API documentation. The process of FIG. 2 may be at least in part implemented on one or more components of analyzer 120 shown in FIG. 1A. In some embodiments, the process is performed by processor 702 shown in FIG. 7.

At 202, an API interaction is received. The API interaction may include any type of interaction with an API such as an API request and/or an API response. Referring to the example shown in FIG. 1B, one type of API interaction is an API request: "curl 'https://api.example.com/v1/products'-X POST -d '{"name": "Blue Shoe", "price": 33.33}'". Another type of API interaction is an API response: "{"id": 124131, "name": "Blue Shoe", "price": 33.33, "created": "2017 May 1 00:23:44"}."

At 204, one or more interaction parameters are determined based on the API interaction. In various embodiments, the API interaction is analyzed to determine the interaction parameter(s). The API interaction may be parsed to determine parameters such as syntactical elements, flags, content, and other attributes. By way of non-limiting example, data that can be determined from an API request includes hostname, HTTP method, security, authentication type, request path (e.g., products requested), and parameters. For example, the hostname may be determined by reading until the end of a string in the API request, where the string that is read is in an expected position in the request. That is, if a format of a request is expected to include the hostname in the first position, then the first string is parsed to determine the name of the host. Specific types of interaction parameters may be determined for specific types of API interactions. For example, request parameters may be determined from API requests and response parameters may be determined from API responses.

Referring to the example API request shown in FIG. 1B, based on "curl 'https://api.example.com/v1/products'-X POST -d '{"name": "Blue Shoe", "price": 33.33}'," the following interaction parameters can be determined and/or derived. In the example of FIG. 1B, analyzer 120 determines by parsing the API request that the hostname is "api.example.com," the HTTP method is "POST," and the parameters are "JSON->name{String}" and "price{Decimal}." In this example, security, authentication type, and request path are not determined. In various embodiments, determination of authentication type includes determining authentication protocols used such as OAuth, key and secret pair, API key, and the like. By way of non-limiting example, data that can be determined from an API response includes response code including errors, response message, and response data.

Referring to the example API response shown in FIG. 1B, based on "{"id": 124131, "name": "Blue Shoe", "price": 33.33, "created": "2017 May 1 00:23:44;"}," the following interaction parameters can be determined and/or derived. In the example of FIG. 1B, analyzer 120 determines by parsing the API response that there are no errors, and the response data includes the following created fields: "JSON->id{Long}," "name{String}," "price{Decimal}," "created{DateTime}." In this example, the API response did not include any errors. This may be determined from an HTTP status code such as 200 or other 200-series success codes. If there is an error, this may be determined from HTTP status codes such as 400 bad request, 404 not found, and other 400 series status codes.

In various embodiments, the determination of interaction parameters (204) includes deducing information based on API requests and responses. That is, information may be determined using the parsed requests and responses, which information might not be readily apparent from a simple parsing of the requests and responses. For example, request parameter types may be determined. The request parameter types include string, decimal, date/time, and other formats. The types may be recognized from the API request content. Referring to the example shown in FIG. 1B, based on the API response "{"id": 124131, "name": "Blue Shoe", "price": 33.33, "created": "2017 May 1 00:23:44"}," the parameter type for "name": "Blue Shoe" is a string, the parameter type for "price": "33.33" is a decimal, and the parameter type for "created": "2017 May 1 00:23:44" is a time stamp of format Date, Time.

Another type of information that may be deduced is whether a request parameter is optional or required. This may be determined based on metadata provided in form fields or by observing a series of API requests. If a number (e.g., threshold number) of API responses corresponding to those requests are successful despite missing a parameter, then it may be deduced that the parameter is not required.

Another type of information that may be deduced is the type of content associated with an API request. Content types include XML, JSON, and the like. The content type, which may not be explicitly stated in the API request or response, may be deduced based on language patterns or the manner in which parameters are furnished in the API request.

Another type of information that may be deduced is security type or protocol. For example, if an API request includes a key, token, or other security mechanism, the security type may be deduced. In various embodiments, an API gateway (e.g., API gateway 110 of FIG. 1A) is part of a security infrastructure of a system and in a privileged position to observe API interactions including security protocols utilized.

Another type of information that may be deduced is a response data schema based on an API response. Using the example of RESTful APIs, a JSON schema may indicate what properties are in objects that will be returned by the RESTful API. For example, the schema may indicate names of properties that will be returned such as title and data type. The schema may include information such as whether a particular property is required, whether the object is a key, lengths and formats of content, and the like. In various embodiments, the determination of the response data schema allows the determination of related objects or nested properties such as relationships and structures including nested objects and arrays. For example, the determination of the schema can include detecting that a related object is in the response, which may in turn prompt the definition of a sub-object schema. The definition of the sub-object schema allows determination of the presence of same object schema in other API responses.

Overall trends and statistics may be determined by observing API interactions. In various embodiments, a group of API interactions may be analyzed to determine trends or statistics for that group. If several API responses include error messages, the corresponding API requests may be analyzed to determine any commonalities and the commonalities may be provided in the API documentation to facilitate determination of a cause of the error messages.

An analyzer may improve at deducing information over time as it observes more traffic. For example, when observing breaking changes to code, an analyzer may learn to recognize a signature of the breaking change to identify this particular type of error. In various embodiments, the analyzer may be trained by machine learning techniques such as supervised learning to improve its analytical abilities.

Figure 8:
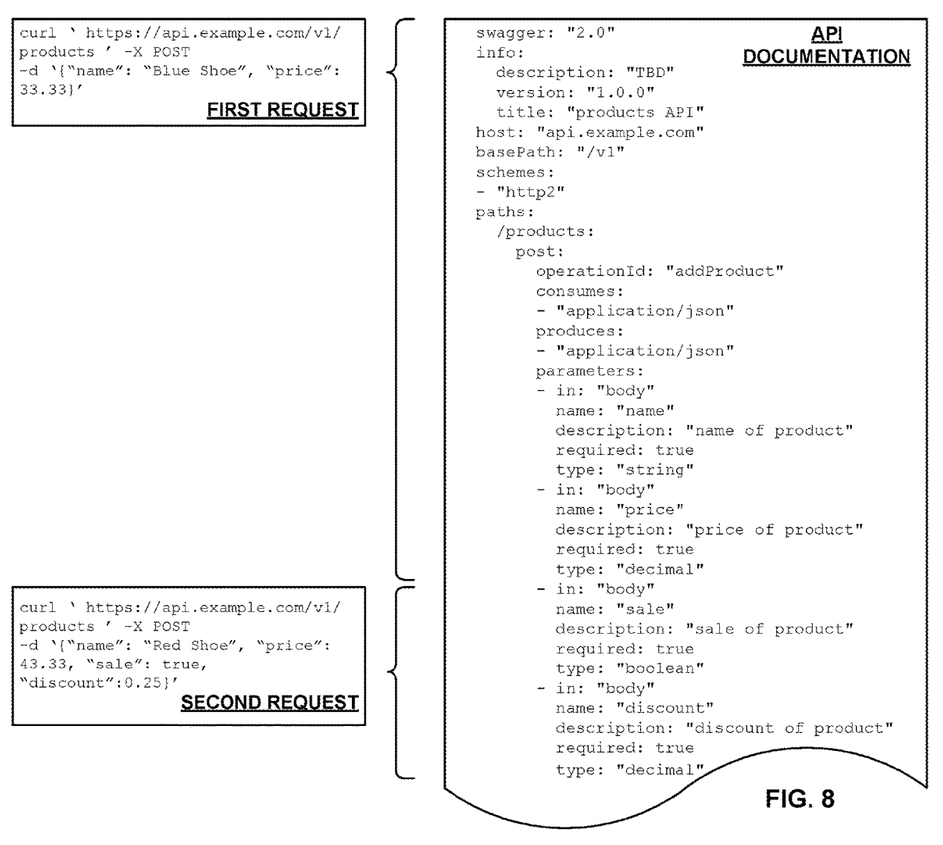
FIG. 8 is a block diagram illustrating an embodiment of API documentation.

At 206, API documentation is generated based on the interaction parameter(s). The API documentation includes documentation of an action associated with an API interaction such as a description of how an API interaction can be used and/or how an API functions. For example, the documentation generated may include definitions and/or descriptors for the determined interaction parameters. Referring to the example shown in FIG. 1B, documentation generated may include descriptors for the determined parameters. For example, based on the request data "Method: Post," a description may be generated. The description may be generated based on various techniques such as natural language processing, looking up the definition of the method definition in a library, and the like. The description such as "POST is a method to generate a data resource path indicating with what a requestor is interacting" may be included in the documentation. In various embodiments, the API documentation is both human-readable and machine-readable. The API documentation may be generated in real time as new API interactions are observed. An example of an automatically-generated API documentation is shown in FIG. 8.

Figure 4:
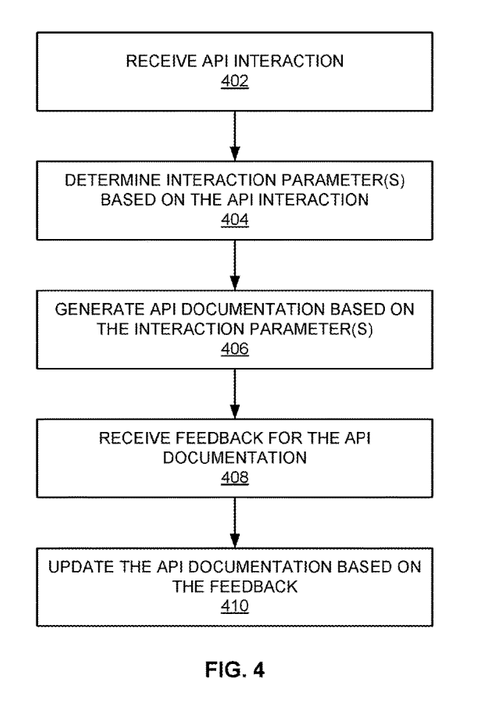
FIG. 4 is a flow chart illustrating an embodiment of a process for generating API documentation based on feedback.

In some embodiments, the API documentation is automatically generated based on API interactions without requiring human intervention. In some embodiments, the API documentation can be reviewed and modified based on feedback such as feedback provided by a human. An example process including human review of API documentation is shown in FIG. 4.

In some embodiments, the API documentation may be generated in real time or substantially simultaneously with API requests and responses as they are made. In some embodiments, the API documentation may be generated based on logged API traffic for legacy APIs.

Figure 3:
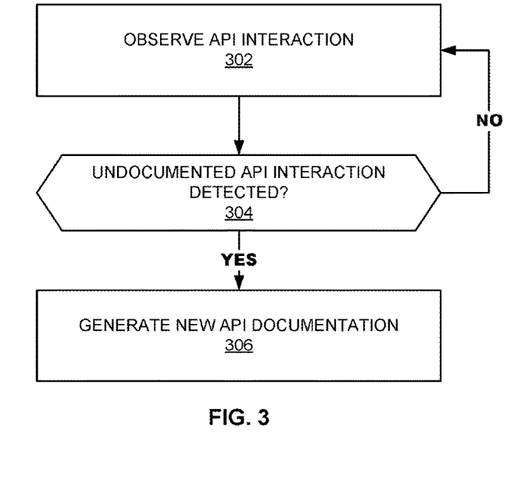
FIG. 3 is a flow chart illustrating an embodiment of a process for generating API documentation for undocumented API interactions.

FIG. 3 is a flow chart illustrating an embodiment of a process for generating API documentation for undocumented API interactions. The process of FIG. 3 may be at least in part implemented on one or more components of system 100 shown in FIG. 1A. For example, the process may be performed by analyzer 120 in conjunction with API gateway 110. In some embodiments, the process is performed by processor 702 shown in FIG. 7.

At 302, an API interaction is observed. The API interaction may include any type of interaction with an API such as an API request and/or an API response. Example API responses and requests are shown in FIG. 1B. In various embodiments, API gateway 110 of FIG. 1A observes API interactions. One or more API interactions may be forwarded to analyzer 120 for further analysis.

At 304, it is determined whether an undocumented API interaction has been detected. In various embodiments, analyzer 120 of FIG. 1A is configured to detect undocumented API interactions. For example, analyzer 120 stores previously-documented API interactions and, when a new API interaction is received, analyzer 120 compares the new API interaction with the log of previously-documented API interactions to determine whether there is a match. If there is a match, then the new API interaction has been previously-documented and is determined to be a documented API interaction. Otherwise, the API interaction is determined to be undocumented.

If an undocumented API interaction is detected, the process proceeds to generate new API documentation (306). The new API documentation corresponds to the undocumented API interaction. The API interaction or an identifier of the API interaction may be stored to note that the API interaction has been documented. Otherwise, if no undocumented API interaction is detected, the process returns to 302 in which API interactions are observed.

FIG. 4 is a flow chart illustrating an embodiment of a process for generating API documentation based on feedback. The process of FIG. 4 may be at least in part implemented on one or more components of system 100 shown in FIG. 1A. For example, the process may be performed by analyzer 120 in conjunction with API gateway 110. In some embodiments, the process is performed by processor 702 shown in FIG. 7.

At 402, an API interaction is received. The API interaction may include any type of interaction with an API such as an API request and/or an API response. Example API responses and requests are shown in FIG. 1B. Examples of receiving or observing an API interaction are 202 of FIG. 2 and 302 of FIG. 3.

At 404, one or more interaction parameters are determined based on the API interaction. The API interaction may be parsed to determine syntactical elements, content, and other attributes. An example of determining interaction parameter(s) is further described with respect to 204 of FIG. 2.

At 406, API documentation is generated based on the interaction parameter(s). The API documentation includes a description of how an API interaction can be used. For example, the documentation generated may include definitions and/or descriptors for the determined interaction parameters. An example of generating API documentation is further described with respect to 206 of FIG. 2.

At 408, feedback for the API documentation is received. The feedback may be provided by an external entity such as another documentation generator or by a user. In various embodiments, the feedback is based on human review of the API documentation. For example, a reviewer may provide feedback about the API documentation such as whether the API documentation is accurate. The reviewer may annotate or edit (e.g., add or remove) portions of the generated API documentation.

At 410, the API documentation is updated based on the feedback. For example, the API documentation may be posted to a repository. In various embodiments, the feedback may be used to improve automatic generation of API documentation. For example, the feedback may be used as part of a validation set to train a machine learning model to improve the automatic documentation of API interactions.

Figure 5:
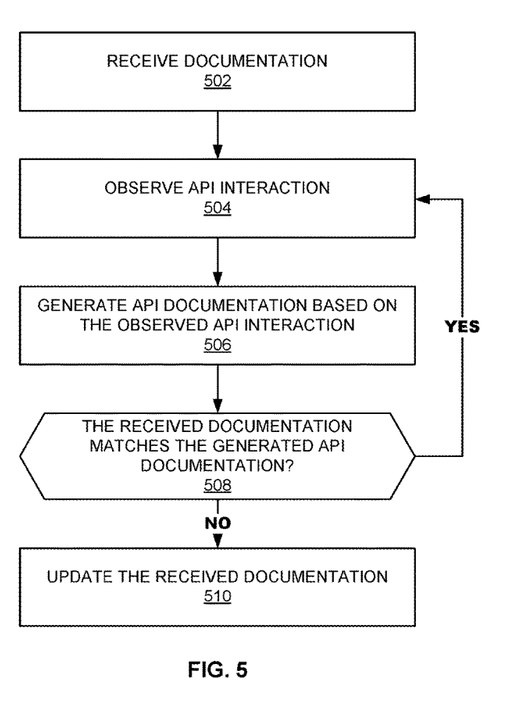
FIG. 5 is a flow chart illustrating an embodiment of a process for auditing the quality of API documentation.

FIG. 5 is a flow chart illustrating an embodiment of a process for auditing the quality of API documentation. The process of FIG. 5 may be at least in part implemented on one or more components of system 100 shown in FIG. 1A. For example, the process may be performed by analyzer 120. In some embodiments, the process is performed by processor 702 shown in FIG. 7.

At 502, documentation is received. The documentation may be manually generated or generated by another system. For example, the documentation may be legacy documentation of an API made by conventional methods such as by a technical writer, developer, or other system. The quality of the documentation may be evaluated as follows.

At 504, an API interaction is observed. The API interaction may include any type of interaction with an API such as an API request and/or an API response. Example API responses and requests are shown in FIG. 1B. Examples of receiving or observing an API interaction are 202 of FIG. 2, 302 of FIG. 3, and 402 of FIG. 4.

At 506, API documentation is generated based on the observed API interaction. The API documentation includes a description of how an API interaction can be used. For example, the documentation generated may include definitions and/or descriptors for the determined interaction parameters. The API documentation may be generated by identifying one or more interaction parameters based on the observed API interaction. An example of generating API documentation is further described with respect to 206 of FIG. 2.

At 508, it is determined whether the received documentation matches the generated documentation. For example, syntactical elements from each documentation may be compared to determine whether there is a match. If the received documentation matches the generated API documentation, the process may return to 504 in which additional API interactions are observed.

Otherwise, if the received documentation does not match the generated API documentation, the process proceeds to 510 in which the received documentation is updated. At least a portion of the received documentation may be updated with the generated documentation such that the received documentation is more accurate. The received documentation may be posted to storage. In one aspect, the process of FIG. 5 is compatible with existing documentation processes and may augment existing processing by making additive or corrective edits to existing documentation. In another aspect, the quality of existing documentation such as manual documentation may be audited by comparing with live-traffic generated documentation (506).

In some embodiments, if the received documentation does not match (in some cases, does not match within a threshold tolerance) the generated documentation, then the received documentation may be scored accordingly. The score of the received documentation may be used to identify the quality of the documentation. For example, if the received documentation does not match the generated documentation, a lower score is assigned to the received documentation indicating lower quality.

Figure 6:
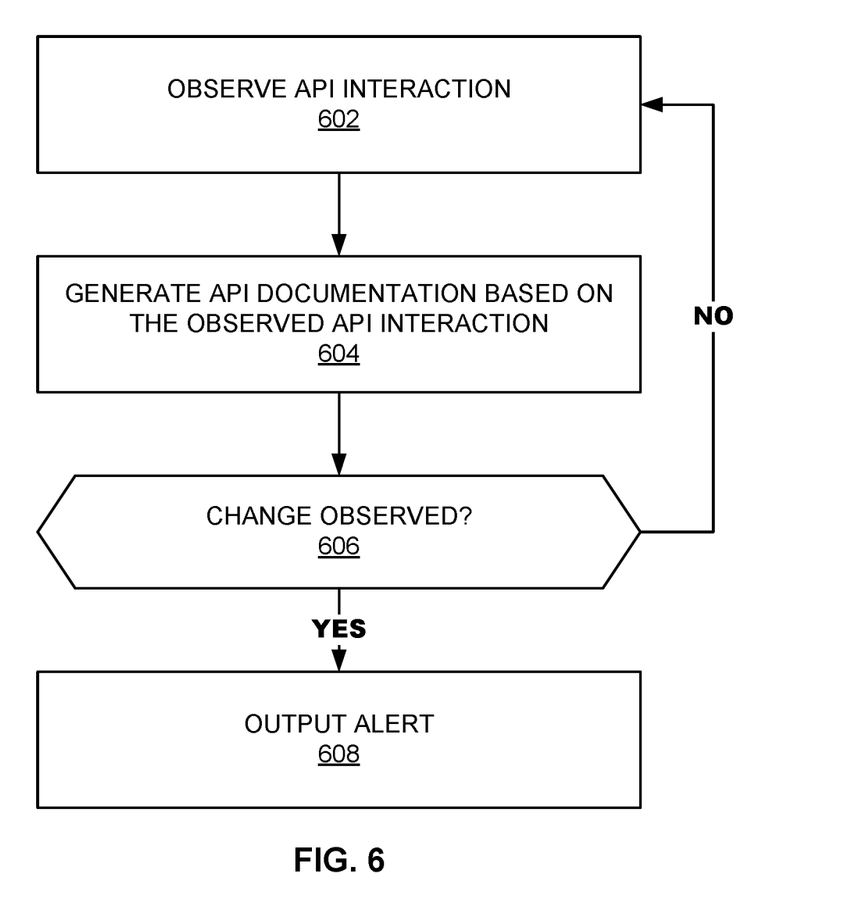
FIG. 6 is a flow chart illustrating an embodiment of a process for generating API documentation and providing an alert.

FIG. 6 is a flow chart illustrating an embodiment of a process for generating API documentation and providing an alert. The process of FIG. 6 may be at least in part implemented on one or more components of system 100 shown in FIG. 1A. For example, the process may be performed by analyzer 120 in conjunction with API gateway 110. In some embodiments, the process is performed by processor 702 shown in FIG. 7.

At 602, an API interaction is observed. The API interaction may include any type of interaction with an API such as an API request and/or an API response. Example API responses and requests are shown in FIG. 1B. Examples of receiving or observing an API interaction are 202 of FIG. 2, 302 of FIG. 3, 402 of FIG. 4, and 504 of FIG. 5.

At 604, API documentation is generated based on the observed API interaction. The API documentation includes a description of how an API interaction can be used. For example, the documentation generated may include definitions and/or descriptors for the determined interaction parameters. The API documentation may be generated by identifying one or more interaction parameters based on the observed API interaction. An example of generating API documentation is further described with respect to 206 of FIG. 2.

At 606, it is determined whether a change is observed. By way of non-limiting example, changes include new or additive changes, errors, and API interactions that were not previously observed. A change may be observed in an API response. For example, changes in underlying functions in an API cause an API response to the same API request to change. Suppose that previously an API request caused one parameter to be returned in the API response, and now the same API request causes two parameters to be returned in the API response. This type of change can be documented by updating the API documentation.

If a change is observed at 606, the process proceeds to 608, in which an alert is output. The alert may be provided to a user in various formats including those indicated by the user to be preferable. For example, the alert may be an email, SMS, visual or audio alert on a user interface, and the like. In various embodiments, if a change is observed, the API documentation is updated accordingly. Otherwise, if a change is not observed, the process returns to 602 to observe API interaction(s). That is, the process includes identifying changes to API documentation and provide an alert if there is a change. For example, when a new release of an API has occurred, an alert may be generated. As another example, if the addition of new parameters is detected, an alert may be generated. As another example, if an error rate associated with an API call meets a threshold (or trends change over time), an alert may be generated. An alert enables an administrator to communicate directly with a developer. In some instances, this allows an error to be detected earlier compared with conventional systems.

Figure 7:
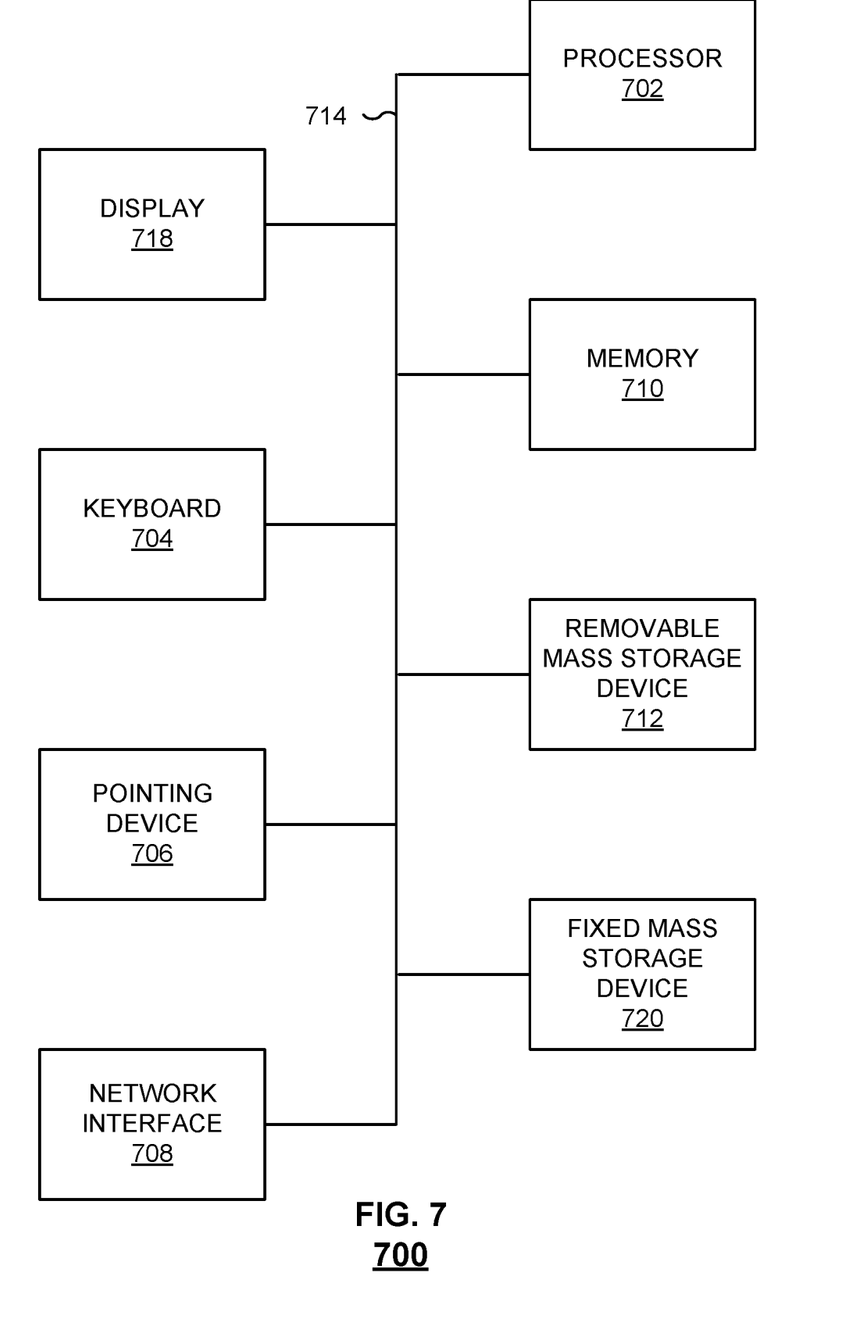
FIG. 7 is a functional diagram illustrating a programmed computer system for generation of API documentation in accordance with some embodiments.

FIG. 7 is a functional diagram illustrating a programmed computer system for generation of API documentation in accordance with some embodiments. As will be apparent, other computer system architectures and configurations can be used to perform the described API documentation generation technique. Computer system 700, which includes various subsystems as described below, includes at least one microprocessor subsystem (also referred to as a processor or a central processing unit (CPU) 702). For example, processor 702 can be implemented by a single-chip processor or by multiple processors. In some embodiments, processor 702 is a general purpose digital processor that controls the operation of the computer system 700. In some embodiments, processor 702 also includes one or more coprocessors or special purpose processors (e.g., a graphics processor, a network processor, etc.). Using instructions retrieved from memory 710, processor 702 controls the reception and manipulation of input data received on an input device (e.g., image processing device 706, I/O device interface 704), and the output and display of data on output devices (e.g., display 718).

Processor 702 is coupled bi-directionally with memory 710, which can include, for example, one or more random access memories (RAM) and/or one or more read-only memories (ROM). As is well known in the art, memory 710 can be used as a general storage area, a temporary (e.g., scratch pad) memory, and/or a cache memory. Memory 710 can also be used to store input data and processed data, as well as to store programming instructions and data, in the form of data objects and text objects, in addition to other data and instructions for processes operating on processor 702. Also as is well known in the art, memory 710 typically includes basic operating instructions, program code, data, and objects used by the processor 702 to perform its functions (e.g., programmed instructions). For example, memory 710 can include any suitable computer readable storage media described below, depending on whether, for example, data access needs to be bi-directional or uni-directional. For example, processor 702 can also directly and very rapidly retrieve and store frequently needed data in a cache memory included in memory 710.

A removable mass storage device 712 provides additional data storage capacity for the computer system 700, and is optionally coupled either bi-directionally (read/write) or uni-directionally (read only) to processor 702. A fixed mass storage 720 can also, for example, provide additional data storage capacity. For example, storage devices 712 and/or 720 can include computer readable media such as magnetic tape, flash memory, PC-CARDS, portable mass storage devices such as hard drives (e.g., magnetic, optical, or solid state drives), holographic storage devices, and other storage devices. Mass storages 712 and/or 720 generally store additional programming instructions, data, and the like that typically are not in active use by the processor 702. It will be appreciated that the information retained within mass storages 712 and 720 can be incorporated, if needed, in standard fashion as part of memory 710 (e.g., RAM) as virtual memory.

In addition to providing processor 702 access to storage subsystems, bus 714 can be used to provide access to other subsystems and devices as well. As shown, these can include a display 718, a network interface 708, an input/output (I/O) device interface 704, an image processing device 706, as well as other subsystems and devices. For example, image processing device 706 can include a camera, a scanner, etc.; I/O device interface 704 can include a device interface for interacting with a touchscreen (e.g., a capacitive touch sensitive screen that supports gesture interpretation), a microphone, a sound card, a speaker, a keyboard, a pointing device (e.g., a mouse, a stylus, a human finger), a Global Positioning System (GPS) receiver, an accelerometer, and/or any other appropriate device interface for interacting with system 700. Multiple I/O device interfaces can be used in conjunction with computer system 700. The I/O device interface can include general and customized interfaces that allow the processor 702 to send and, more typically, receive data from other devices such as keyboards, pointing devices, microphones, touchscreens, transducer card readers, tape readers, voice or handwriting recognizers, biometrics readers, cameras, portable mass storage devices, and other computers.

The network interface 708 allows processor 702 to be coupled to another computer, computer network, or telecommunications network using a network connection as shown. For example, through the network interface 708, the processor 702 can receive information (e.g., data objects or program instructions) from another network, or output information to another network in the course of performing method/process steps. Information, often represented as a sequence of instructions to be executed on a processor, can be received from and outputted to another network. An interface card or similar device and appropriate software implemented by (e.g., executed/performed on) processor 702 can be used to connect the computer system 700 to an external network and transfer data according to standard protocols. For example, various process embodiments disclosed herein can be executed on processor 702, or can be performed across a network such as the Internet, intranet networks, or local area networks, in conjunction with a remote processor that shares a portion of the processing. Additional mass storage devices (not shown) can also be connected to processor 702 through network interface 708.

In addition, various embodiments disclosed herein further relate to computer storage products with a computer readable medium that includes program code for performing various computer-implemented operations. The computer readable medium includes any data storage device that can store data which can thereafter be read by a computer system. Examples of computer readable media include, but are not limited to: magnetic media such as disks and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code as produced, for example, by a compiler, or files containing higher level code (e.g., script) that can be executed using an interpreter.

The computer system shown in FIG. 7 is but an example of a computer system suitable for use with the various embodiments disclosed herein. Other computer systems suitable for such use can include additional or fewer subsystems. In some computer systems, subsystems can share components (e.g., for touchscreen-based devices such as smart phones, tablets, etc., I/O device interface 704 and display 718 share the touch sensitive screen component, which both detects user inputs and displays outputs to the user). In addition, bus 714 is illustrative of any interconnection scheme serving to link the subsystems. Other computer architectures having different configurations of subsystems can also be utilized.

FIG. 8 is a block diagram illustrating an embodiment of API documentation. The API documentation may be automatically generated based on the first and second requests shown. The API documentation system may be generated by the processes described herein. In this example, in response to receiving the first call, "curl 'https://api.example.com/v1/products'-X POST -d '{"name": "Blue Shoe", "price": 33.33}," the corresponding portion (name and price properties) in the API documentation is automatically generated. In response to receiving the second call, "curl 'https://api.example.com/v1/products'-X POST -d '{"name": "Red Shoe", "price": 43.33, "sale": true, "discount":0.25}'," the corresponding portion (sale and discount properties) of the API documentation is automatically generated.

The API documentation is updated accordingly. The API documentation may be continuously updated with new resources, properties, characteristics, and the like. In the example shown in FIG. 8, the sale and discount properties are first seen in the second request and not the first request.

The techniques described herein provide many advantages over conventional API documentation techniques. In one aspect, documentation creation, including documentation of legacy APIs is automated. In another aspect, the processes described herein are compatible with existing documentation processes, allowing conventional documentation techniques to be augmented by additive or corrective edits. The processes described herein are also compatible with existing security frameworks, and can easily be incorporated into current infrastructures. In yet another aspect, the quality of existing documentation strategies such as manual documentation can be audited by comparing existing documentation to live-traffic versions generated according to the processes described herein.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method comprising:
  receiving an application programming interface (API) request and one or more API responses, wherein the API request and the one or more API responses are generated using the API;
  determining at least one interaction parameter based on the API request, the one or more API responses, or both, the interaction parameter corresponds to data included in the API request, at least one of the API responses, or both;
  using a validation dataset to train a machine learning model, the validation dataset including feedback related to the accuracy of automatically generated API documentation;
  using statistics generated by the machine learning model to analyze the at least one interaction parameter corresponding to the API; and
  generating the automatically generated API documentation based on the statistics and the at least one interaction parameter, wherein the API documentation includes descriptions of the API request, the one or more API responses, or both, and a description of the interaction parameter.

2. The method of claim 1, wherein the validation dataset comprises feedback from at least one selected from a group comprising a user, a document generator, and storage device.

3. The method of claim 1, wherein the API request includes at least one request parameter and the one or more API responses includes at least one response parameter.

4. The method of claim 3, wherein the API request includes at least one optional request parameter.

5. The method of claim 3, wherein the at least one response parameter includes a response code, response message, and response data.

6. The method of claim 1, further comprising:
  receiving audit documentation;
  comparing the audit documentation with the automatically generated API documentation; and
  responsive to a determining of a mismatch between the audit documentation and the automatically generated API documentation, updating the audit documentation.

7. The method of claim 1, further comprising triggering an automated workflow based on the automatically generated API documentation.

8. A system comprising:
  a gateway for receiving application requests and one or more application responses;
  an analyzer for:
  receiving an application programming interface (API) request and one or more API responses, wherein the API request and the one or more API responses are generated using the API;
  determining at least one interaction parameter based on the API request, the one or more API responses, or both, the interaction parameter corresponds to data included in the API request, at least one of the API responses, or both;
  using a validation dataset to train a machine learning model, the validation dataset including feedback related to the accuracy of automatically generated API documentation;
  using statistics generated by the machine learning model to analyze the at least one interaction parameter corresponding to the API; and
  generating the automatically generated API documentation based on the statistics and the at least one interaction parameter, wherein the API documentation documents includes descriptions of the API request, the one or more API responses, or both, and a description of the interaction parameter.

9. The system of claim 8, wherein the validation dataset comprises feedback from at least one selected from a group comprising a user, a document generator, and storage device.

10. The system of claim 8, wherein the API request includes at least one request parameter and the one or more API responses includes at least one response parameter.

11. The system of claim 10, wherein the API request includes at least one optional request parameter.

12. The system of claim 10, wherein the at least one response parameter includes a response code, response message, and response data.

13. The system of claim 8, further comprising the analyzer:
receiving audit documentation;
comparing the audit documentation with the automatically generated API documentation; and
responsive to a determining of a mismatch between the audit documentation and the automatically generated API documentation, updating the audit documentation.

14. The system of claim 8, further comprising the analyzer triggering an automated workflow based on the automatically generated API documentation.

15. An apparatus comprising:
an analyzer for:
receiving an application programming interface (API) request and one or more API responses from a gateway, wherein the API request and the one or more API responses are generated using the API;
determining at least one interaction parameter based on the API request, the one or more API responses, or both, the interaction parameter corresponds to data included in the API request, at least one of the API responses, or both; and
means for automatically generating API documentation that describes the API request, at least one of the one or more API responses, and the interaction parameter;
wherein the means for automatically generating the API documentation comprises training a machine learning model that generates the API documentation with a validation dataset.

16. The apparatus of claim 15, wherein the validation dataset comprises feedback from at least one selected from a group comprising a user, a document generator, and storage device.

17. The apparatus of claim 15, wherein the API request includes at least one request parameter and the one or more API responses includes at least one response parameter.

18. The apparatus of claim 17, wherein the API request includes at least one optional request parameter.

19. The apparatus of claim 17, wherein the at least one response parameter includes a response code, response message, and response data.

20. The apparatus of claim 15, further comprising the analyzer:
receiving audit documentation;
comparing the audit documentation with the automatically generated API documentation; and
responsive to a determining of a mismatch between the audit documentation and the automatically generated API documentation, updating the audit documentation.

\* \* \* \* \*